Nov. 3, 1964  J. A. O'NEIL  3,154,876
FISHHOOK
Filed Feb. 15, 1962
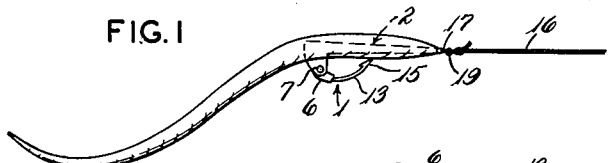
FIG. 1
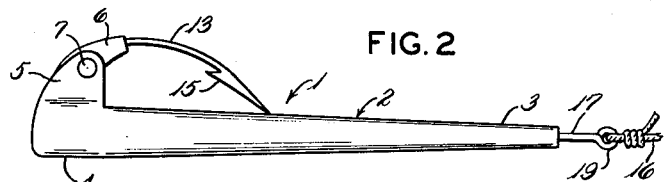
FIG. 2
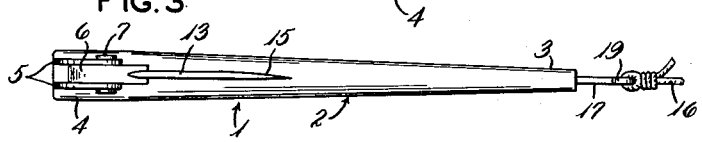
FIG. 3
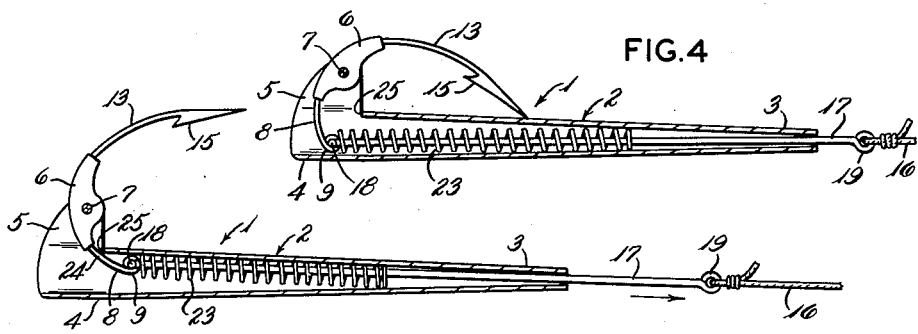
FIG. 4
FIG. 5
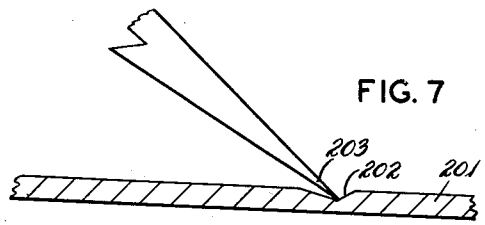
FIG. 7
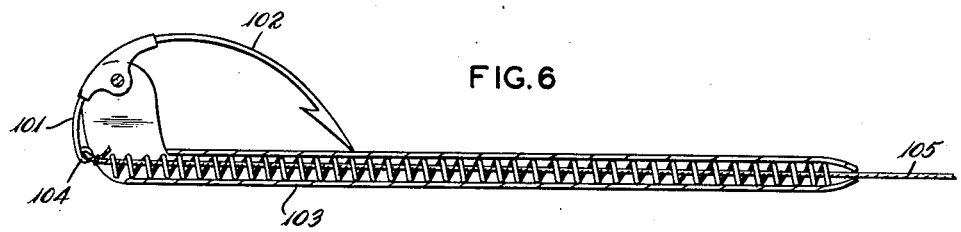
FIG. 6
INVENTOR.
JOHN A. O'NEIL
BY Olaf Nielsen
ATTY.

United States Patent Office 3,154,876
Patented Nov. 3, 1964

3,154,876
FISHHOOK
John A. O'Neil, Akron, Ohio
(2484 Bimini Lane, Fort Lauderdale, Fla.)
Filed Feb. 15, 1962, Ser. No. 173,442
1 Claim. (Cl. 43—37)

This invention relates to fishhooks and more particularly to a novel type of hook which is useful in fishing areas where interference is generally found with the conventional known forms of hooks.

Conventional hooks are of limited practicality particularly when used with tackle trolled from boats or when utilized in casting due to the fact that the fixed hook with its forward-pointing barb is very susceptible to weed pickup as it is drawn through the water; further, the exposed barb of the conventional "open" hook invites snagging of the hook on stream bottoms, submerged grass-beds, logs, etc. Additionally, when fixed hooks are sufficiently large to be employed for large game-fish, the size of the hook often interferes with the fish taking the hook into its mouth after it has struck the hook.

The conventional weedless hook has the further disadvantage that the fish, when it strikes, must depress the so-called "weedless" wire portion to engage the hook. This tends to rotate the hook about its shank portion, so that hooking occurs only in the lip, an unsatisfactory result. The hook of the present invention, however, is small in the closed position, and utilizes nothing which must first be pushed out of the way when the fish strikes, thus allowing the hook to pass far into the mouth for engagement.

The hook of the invention solves all the above problems, by providing a multi-piece hook which is normally in closed position as it is drawn through the water, but which opens from a very small size into a large, rigid hook as it is struck by the fish and tension is placed on the fish-line by the fisherman.

As opposed to some well-known fishing lures which have cumbersome mechanisms concealed within a lure-body, the present hook is of simple construction, and is of a sufficiently small size that it may be used alone, carrying bait on its body or even on its barbed portion. Alternatively, the hook has been found to be extremely successful when inserted into the body of an artifical lure, a plastic worm for example; as part of a spinner assembly; within a feathered lure; with a spoon; or into a natural bait body, thus being utilized as the hook portion of a lure, rather than as a plain hook.

It is an object of this invention to provide a streamlined, weedless, snagproof fishhook in which the point of the barb is normally closed against the body of the hook.

It is a further object of the present invention to provide a multi-part fishhook which may be articulated by the fisherman from a normally closed position into a rigid, open position.

Another object of this invention is the provision of a fishhook having a pivotal barb-carrying portion which, when in the open position, has its forward-pointing portion substantially parallel to the direction of the pull on the fish-line, for maximum penetrating effect.

Yet another object of this invention is the provision in a fishhook of a barb-carrying portion of relatively short length pivoted for maximum strength and stability at a point radially offset from the generally tubular main body portion.

Further objects and advantages of the present invention will become apparent from the following description of a preferred form of the invention, reference being had to the drawings wherein FIGURE 1 is a side view of a lure incorporating the hook of the invention;

FIGURE 2 is a side elevation of the hook in closed position;

FIGURE 3 is a plan view of the hook in closed position;

FIGURE 4 is a longitudinal sectional view of the hook in the closed position;

FIGURE 5 is a view similar to FIGURE 4 but showing the hook in open position;

FIGURE 6 is a view of a modified form of the invention, showing an alternate means of hook-up of the fishing line; and FIGURE 7 is an enlarged fragmentary sectional view of yet another modified form of the invention, showing the barb point buried in the hook body, in the closed position thereof.

The hook of the invention, denoted by the numeral 1 comprises a tubular main body portion 2, shown generally tapering toward the forward end 3. On the rear portion 4 of the body 2 is located a support member comprising generally radially extending, spaced lugs 5. Between the lugs 5 is located the curved bow portion 6, as by a rivet or grommet 7 passing through the bow and the radial outer-ends of lugs 5.

The inner portion 8 of bow 6 lies generally between the lugs 5 and extends within the rear portion 4 of the body 2, where it terminates in a fastening eye 9.

The outer portion 13 of the bow 6 terminates in a barbed section 15 which, in the open position of the hook shown in FIGURE 5, extends substantially parallel to the body portion 2 and generally in alignment with the direction of pull on fish line 16.

A pull bar 17 extends longitudinally of the interior of the body 2 and is connected at its rearward end 18 to fastening eye 9 of the bow 6. At its forward end, pull bar 17 is provided with means such as eye 19 to which is tied fish line 16. Between the fastening eye 9 and the tapering end 3 of the body is interposed a coil spring 23. Some other form of resilient member may, of course, be utilized.

During normal dragging of the fishing implement through the water, the hook is in the barb-down position shown in FIGURE 1. This places the barb-portion of the hook in position to engage the striking fish in the bottom of its mouth, a most vulnerable area.

In this condition, as shown in FIGURES 1-4, the spring 23 is in the extended position, maintaining the point of barb 15 closed against the body 2, thus preventing weed-pickup and snagging and providing a small profile for easy entry into the fish's mouth.

When a fish strikes the hook and a pull is exerted on line 16, the pull-bar 17 moves axially forward, pulling the lower bow section 8 forward against the compression of spring 23. This turns bow 6 about pivot 7 until the portion 24 of the bow moves into engagement with stop section 25 on the rear portion 4 of body 2. The hook is now in the open position, with the bow solidly anchored against stop 25 to give maximum resistance to the pull of the hooked fish.

Since the free outer bow portion 13 is of minimum length due to its being supported near the ends of lugs 5, and thus at a point removed radially a substantial distance from the main body 2, maximum strength against bending of the bow is provided.

FIGURE 6 shows a modified form of the invention, wherein the inner end 101 of the bow 102 extends slightly rearwardly of the main body portion 103 when the hook is in closed position, exposing fastening eye 104. In this modification, the fishing line 105 is threaded through the body 103 and tied at fastening eye 104.

FIGURE 7 shows another modification wherein the wall 201 of the main body portion is provided with a slight depression or recesss 202 adapted to receive the point 203 of the barb when the hook is in the closed position, thus insuring further that no weeds are picked up and that the hook does not snag.

Further embodiments and modifications will be apparent to those skilled in the art without departing from the scope of the invention.

What is claimed is:

A weedless fishhook, comprising
(1) an axial body,
(2) a support on said body having a pivot laterally offset from said body,
(3) a bow supported on said pivot and having
   (a) an outer barbed end, and
   (b) an inner end, and
(4) means for freely selectively opening and closing said bow with respect to said body, comprising
   (a) a generally axially extending pull means connected to said inner bow-end, and
   (b) a spring in said body acting on the junction of said inner bow-end and said pull means and normally biasing said barbed end closed,
said bow having a portion between said pivot and inner end adapted to supportingly engage said body in the open position of said bow.

References Cited in the file of this patent

UNITED STATES PATENTS

| | | |
|---|---|---|
| 330,793 | Lie | Nov. 17, 1885 |
| 1,791,083 | Pike | Feb. 3, 1931 |
| 1,890,266 | Schadell et al. | Dec. 6, 1932 |
| 2,087,955 | Middlemiss | July 27, 1937 |
| 2,424,706 | Pelham | July 29, 1947 |